(12) United States Patent
Bienas et al.

(10) Patent No.: US 9,363,793 B2
(45) Date of Patent: Jun. 7, 2016

(54) METHODS AND APPARATUS FOR OPTIMIZING PAGING MECHANISMS USING DEVICE CONTEXT INFORMATION

(71) Applicant: APPLE INC., Cupertino, CA (US)

(72) Inventors: Maik Bienas, Braunschweig (DE); Hyung-Nam Choi, Hamburg (DE)

(73) Assignee: APPLE INC., Cupertino, CA (US)

( * ) Notice: Subject to any disclaimer, the term of this patent is extended or adjusted under 35 U.S.C. 154(b) by 158 days.

(21) Appl. No.: 14/107,326

(22) Filed: Dec. 16, 2013

(65) Prior Publication Data

US 2014/0099965 A1 Apr. 10, 2014

Related U.S. Application Data

(63) Continuation of application No. 12/610,145, filed on Oct. 30, 2009, now Pat. No. 8,611,895.

(51) Int. Cl.

| | |
|---|---|
| H04W 4/00 | (2009.01) |
| H04W 68/00 | (2009.01) |
| H04W 72/02 | (2009.01) |
| H04W 68/02 | (2009.01) |
| H04W 48/16 | (2009.01) |
| H04W 48/18 | (2009.01) |
| H04W 48/20 | (2009.01) |

(52) U.S. Cl.
CPC .............. *H04W 72/02* (2013.01); *H04W 48/16* (2013.01); *H04W 48/18* (2013.01); *H04W 68/02* (2013.01); *H04W 48/20* (2013.01)

(58) Field of Classification Search
CPC ..... H04W 48/16; H04W 48/18; H04W 48/20; H04W 68/00

USPC .................. 455/434, 77; 340/7.23; 370/329
See application file for complete search history.

(56) References Cited

U.S. PATENT DOCUMENTS 4,823,123 A * 4/1989 Siwiak ................. G08B 3/1016
340/7.23
5,119,502 A * 6/1992 Kallin et al. .................. 455/434

(Continued)

FOREIGN PATENT DOCUMENTS

| | | |
|---|---|---|
| CN | 1282183 | 1/2001 |
| JP | 2009/232277 | 10/2009 |

OTHER PUBLICATIONS

3GPP TSG RAN WG2 Meeting #67bis R2-095486, Miyazaki, Japan, Oct. 12-16, 2009, 2pps.

*Primary Examiner* — William D Cumming
(74) *Attorney, Agent, or Firm* — Fay Kaplun & Marcin, LLP

(57) ABSTRACT

Methods and apparatus enabling a wireless network to optimize paging channel operation, based on mobile device context information. In one embodiment, the wireless network is a cellular network (e.g., LTE-Advanced), and both base stations and cellular user devices dynamically exchange and maintain a paging agreement. The paging agreement limits the paging channel operation, thereby minimizing unnecessary scanning and usage of irrelevant radio resources. Such paging mechanisms are limited to the air interface between the base station and the mobile device, and are compatible with existing legacy devices and network entities. Networks with appropriately enabled user devices may improve their resource utilization. Base stations may advantageously reclaim freed-up cellular resources to support other services.

18 Claims, 14 Drawing Sheets

(56) References Cited

U.S. PATENT DOCUMENTS

| | | | |
|---|---|---|---|
| 8,611,895 B2 * | 12/2013 | Bienas et al. | 455/434 |
| 2010/0130140 A1 * | 5/2010 | Waku | H01Q 1/243 455/77 |
| 2010/0165927 A1 * | 7/2010 | Kim | H04W 68/00 370/329 |
| 2011/0070900 A1 * | 3/2011 | Shi | H04W 68/00 455/458 |
| 2011/0077043 A1 | 3/2011 | Aoyagi et al. | |

* cited by examiner

METHODS AND APPARATUS FOR OPTIMIZING PAGING MECHANISMS USING DEVICE CONTEXT INFORMATION

The present application is a continuation application of U.S. patent application Ser. No. 12/610,145, filed Oct. 30, 2009, which is incorporated herein by reference in its entirety. This application is related to co-owned and co-pending U.S. patent application Ser. No. 12/409,398 filed Mar. 23, 2009 and entitled "Methods and Apparatus for Optimizing Paging Mechanisms and Publication of Dynamic Paging Mechanisms", which is incorporated herein by reference in its entirety.

RELATED APPLICATIONS

This application is related to co-owned and co-pending U.S. patent application Ser. No. 12/409,398 filed Mar. 23, 2009 and entitled "Methods and Apparatus for Optimizing Paging Mechanisms and Publication of Dynamic Paging Mechanisms", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to methods and apparatus for optimizing paging transmissions in a wireless communication and data network based on mobile device context information.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in the future, namely to speeds on the order of 300 Mbps in the downlink transmission direction and 75 Mbps in the uplink transmission direction.

Further advancements of 3GPP are being investigated within LTE towards an LMT-Advanced radio interface technology, referred to as "LTE-Advanced" or "LTE-A". Details regarding scope and objectives of the LTE-Advanced study are described at, inter alia; RP-080137 entitled *"Further advancements for E-UTRA (LTE-Advanced)"* to NTT DoCoMo et al., the contents of which are incorporated herein by reference in its entirety. The IMT-Advanced activities have been commenced and are guided by ITU-R (International Telecommunications Union—Radio Communication Sector). Key features to be supported by candidate IMT-Advanced systems have been set by ITU-R and include amongst others: (1) high quality mobile services; (2) worldwide roaming capability; and (3) peak data rates of one hundred (100) Mbps for high mobility environments, and of one (1) Gbps for low mobility environments.

The current discussions in 3GPP related to LTE-A are focused on the technologies to further evolve LTE in terms of spectral efficiency, cell edge throughput, coverage and latency based on the requirements in 3GPP TS 36.913: *"Requirements for further advancements for E-UTRA (LTE-Advanced)"*, the contents of which are incorporated herein by reference in its entirety. Candidate technologies include (1) multi-hop Relay; (2) downlink network Multiple Input Multiple Output (MIMO) antenna technologies; (3) support for bandwidths greater than twenty (20) MHz by spectrum aggregation; (4) flexible spectrum usage/spectrum sharing; and (5) intercell interference management. Backward compatibility with legacy LTE networks is also an important requirement for future LTE-A networks, i.e. an LTE-A network also supports LTE User Equipment (UE), and an LTE-A UE can operate in an LTE network.

Prior Art Paging Mechanisms—

Paging mechanisms are used in many prior art cellular mobile radio communication systems such as UMTS and LTE. Paging mechanisms allow a mobile device to minimize power consumption by operating in a reduced or "idle" state while unused. Once a UE receives a paging notification, it "wakes up" to respond to the notification.

Various approaches to paging mechanisms within wireless systems are evidenced in the prior art. For example, within most cellular networks, the network operator maintains an approximate location or "Tracking Area" (TA) for idle mobile devices. Each TA consists of several cells. When a mobile device is paged, all assigned cells within the TA transmit the paging notification. Presumably, as long as the mobile device has not moved out of the TA, it should receive the paging notification. Unfortunately, larger tracking areas that provide better paging coverage also consume proportionately more radio spectrum and resources; thus the prior art solutions trade coverage area for resource utilization.

Incipient LTE-A networks flexibly fragment and/or aggregate spectrum bandwidths freely. Regrettably however, such spectrum flexibility considerably complicates paging; as a UE moves through a tracking area, the bandwidth usage may vary widely. For example, the UE is generally unaware of the resource configuration used for paging messaging. Similarly, the network does not know which resources the UE is monitoring for paging channel reception. Thus, existing networks transmit paging channel messages over the entire cell bandwidth for each cell of the TA, until contact with the mobile device is re-established.

Accordingly, suitable paging mechanisms are needed to specifically address networks having fragmented multi-hand operational capabilities, and flexible resourcing. Such an improved solution should ideally operate seamlessly and without adversely impacting user experience on existing radio apparatus, and that of other wireless devices (i.e., remaining backward compatible).

Improved apparatus and methods for paging mechanisms specifically addressing the complexities of the new LTE-Advanced architecture are also needed. The LTE-Advanced system architecture combines fragmented multiband capabilities, OFDM access, and mixed populations of legacy and newer UEs. Existing mechanisms for paging within this architecture are less than optimal.

SUMMARY OF THE INVENTION

The present invention satisfies the aforementioned needs by providing improved apparatus and methods for paging in a wireless network. In one aspect of the invention, a method of paging a mobile device from a base station in a wireless network is disclosed. In one embodiment, the paging is based on a selected resource used by the mobile device to receive a paging channel, and the method includes: receiving information regarding a resource used by the mobile device when the mobile device selects that resource; and sending paging information to the mobile device from the base station using only a paging channel of the used resource. If no used resource information exists, no paging information is sent to the mobile device.

In one variant, the base station includes an LTE-compliant eNodeB, and the mobile device is an LTE-compliant UE, and the selected resource includes at least one component carrier (CC).

In another variant, the base station is an LTE-A (Long Term Evolution-Advanced)-compliant eNodeB which is configured to support a 20-MHz maximum bandwidth for the at least one component carrier, so as to maintain backward compatibility with extant LTE apparatus. The selected resource used by the mobile device to receive the paging channel is used in an idle (non-connected) mode.

In a second aspect of the invention, a base station apparatus is disclosed. In one embodiment, the apparatus includes: a digital processor; a radio interface in data communication with the processor; and a storage device in data communication with the processor, the storage device comprising computer-executable instructions that, when executed by the digital processor: (i) responsive to receiving an update message from a mobile device via the radio interface: negotiate a paging agreement with the mobile device; and start a timing function; (ii) responsive to receiving an indication via the radio interface, reset the timing function; and (iii) responsive to the timing function expiring, delete the paging agreement.

In one variant, the apparatus further includes a broadband interface in data communication with the processor; and wherein responsive to receiving a network page addressed to the mobile device via the broadband interface. The apparatus further: determines the existence of the paging agreement; if the paging agreement does not exist, ignores the network page; and if the paging agreement exists, transmits a paging channel message to the mobile device based on the paging agreement.

In another variant, the indication includes a substantially periodic heartbeat message, and the timing function is a watchdog timer.

In yet another variant, the base station apparatus and the mobile device are each LTE-A (Long Term Evolution—Advanced) compliant.

In a third aspect of the invention, a mobile communication apparatus is disclosed. In one embodiment, the apparatus includes: a digital processor; a wireless interface in data communication with the processor; and a storage device in data communication with the processor, the storage device comprising computer-executable instructions. When executed by the digital processor, the instructions: cause transmission of an update message, the update message configured to cause a receiver thereof to generate a paging agreement, and invoke a timing function having a first schedule; and cause transmission of a second message having a second schedule different than the first schedule, the second message being configured to cause extension of the paging agreement.

In one variant, the second message is further configured to cause the receiving base station to restart the timing function.

In another variant, the paging agreement includes a specification of at least: (i) a component carrier to be used for paging the mobile apparatus; and (ii) at least one timing parameter to be used for periodic transmission of the second message.

In a fourth aspect of the invention, a method of efficiently transmitting paging messages is disclosed. In one embodiment, the messages are transmitted to a mobile device from a plurality of base stations of a wireless network, and the method includes: within a subset of the base stations, generating a paging agreement between at least one base station and the mobile device, the at least one base station being part of the subset; storing context information at the at least one base station; receiving data for the mobile device at the subset of the plurality of base stations; and transmitting a paging message from only the at least one base station having the generated paging agreement.

In one variant, the context information includes a description of at least one paging resource available to the mobile device.

In another variant, the mobile device is operating in an idle, unconnected mode.

In a fifth aspect of the invention, a method of conducting paging operations in a multi-cell network is disclosed. In one embodiment, the method includes: designating a tracking area having a plurality of base stations associated therewith; associating a mobile device with the tracking area; and specifying, using at least the mobile device, only a subset of the plurality of base stations to perform paging of the mobile device.

In one variant, the network includes a core portion in operative communication with the plurality of base stations, the core portion not being appraised of the specification of the subset of base stations. The mobile device and base stations are Long-Term Evolution-Advanced. (LTE-A) compliant, and the core portion is LTE compliant, and not Long-Term Evolution-Advanced (LTE-A) compliant.

In a sixth aspect of the invention, a computer readable apparatus is disclosed. In one embodiment, the apparatus includes a storage medium having at least one computer program, the at least one program being configured to enable power-efficient paging operations for a mobile device within a cellular network.

In a seventh aspect of the invention, a wireless network is disclosed. In one embodiment, the network is an LTE-compliant cellular network, with portions of the network (i.e., base stations and UEs) being compliant with LTE-A so that the benefits of LTE-A can be realized, yet with power- and resource-efficient paging mode operation.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1A:
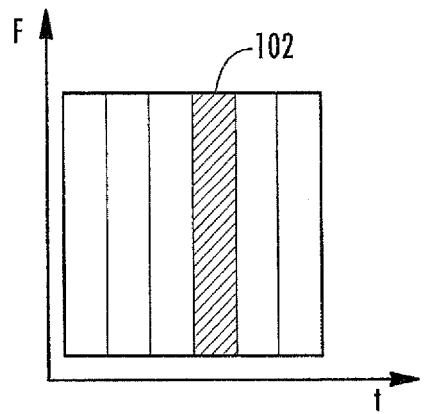
FIG. 1A is time and frequency plot of a typical prior art Time Division Multiple Access (TDMA) implementation.

Reference is now made to the drawings, wherein like numerals refer to like parts throughout.
Overview In one aspect, the present invention discloses methods and apparatus for modifying paging channel operation within wireless communications systems based on context information. This feature allows, for example, base stations to significantly reduce bandwidth used for paging operations. In one embodiment, a paging agreement is exchanged between a base station of a tracking area and a mobile device. The base station and mobile device conform to the paging agreement for future paging channel transactions (e.g., appropriate component carriers, timing, etc.). Additional features are disclosed for automatically ensuring paging agreement validity.

Such methods and apparatus are particularly useful for addressing the management of paging capabilities within networks having fragmented multi-band operational capabilities, and flexible resource allocation/utilization such as, inter alia, LTE-Advanced architectures.

In one implementation of the invention, mobile device context information includes one or more of mobile device identity, hardware version, default refresh timer period, one or more suggested radio resources, base station reception information, etc. Context information is evaluated by the base station to determine a paging agreement. In some embodiments, a mobile device may simultaneously maintain multiple paging agreements with multiple base stations.

In another aspect of the invention, methods and apparatus are disclosed wherein paging agreements are periodically refreshed, either by the mobile device or the base station. In some embodiments, paging agreements that are not refreshed are terminated. In alternate embodiments, paging agreements that are not refreshed trigger revival procedures, to recover the original paging agreement. More generally, broader solutions for unexpected behaviors of paging agreements are disclosed. In some implementations, inconsistent paging behavior (with respect to the paging agreement) terminates the paging agreement. Similarly, inconsistent paging behavior may also trigger revival or recovery actions, such as retry attempts for paging message delivery.

DETAILED DESCRIPTION OF EXEMPLARY EMBODIMENTS

Exemplary embodiments of the present invention are now described in detail. While these embodiments are primarily discussed in the context of a UMTS wireless network, and more specifically in one variant to fourth-generation ("4G") UMTS, LTE and LTE-A networks, it will be recognized by those of ordinary skill that the present invention is not so limited. In fact, the various aspects of the invention are useful in any wireless system (e.g., cellular networks, wireless local area networks, ad hoc connections, etc.) that can benefit from the paging mechanisms described herein. Examples of such wireless systems include Wi-Fi™, WiMAX™, Bluetooth™, etc.

In the following discussion of the exemplary embodiments of the invention, a cellular radio system includes a network of radio cells each served by a transmitting station, known as a cell site or base station. The radio network provides wireless communications service for a plurality of transceivers (in most cases mobile). The network of base stations working in collaboration allows for wireless service which is greater than the radio coverage provided by a single serving base station. The individual base stations are connected by another network (in many cases a wired network), which includes additional controllers for resource management and in some cases access to other network systems (such as the Internet) or MANs.

In LTE there are two (2) distinct types of base stations: eNodeB (eNB), and Home eNodeB (HNB). In prior cellular networks, the network of base stations was owned and or controlled by a single network operator entity. The 3GPP has introduced a new network element known as "Home Node B" (HNB). A Home Base Station (or Home NodeB (HNB), or Home eNodeB (HeNB) in 3GPP terminology) is a base station optimized for use in residential, corporate, or similar environments (e.g., private homes, public restaurants, small offices, enterprises, hospitals, etc., and hence the tom "home"

is not meant to be limiting to residential applications). In the present context, the terms "Home Base Station", "Home NodeB" (for UMTS), "Home eNodeB" (for LTE) refer generally to a "femtocell". In the present context, the terms base station, "NodeB", and "eNodeB" (for LTE) refer generally to a "macrocell".

Long Term Evolution (LTE) Access Methods

The current LTE specification defines several flexible multiple access methods to improve transmission over the air interface to increase potential transmission rates. LTE specifies Orthogonal Frequency Division Multiple Access (OFDMA) in combination with Time Division Multiple Access (TDMA) for downlink access. This hybrid access technique subsequently also called OFDMA/TDMA, is a multi-carrier multiple access method in which a subscriber is provided with a defined number of subcarriers in the frequency spectrum and a defined transmission time for the purpose of data transmission. LTE further specifies SC-FDMA (Single Carrier Frequency Division Multiple Access) in combination with TDMA for uplink access. Furthermore, LTE supports full-duplex FDD (frequency division duplexing), half-duplex FDD and TDD (time division duplexing). Lastly, LTE supports scalable bandwidth segments of one point four (L4), three (3), five (5), ten (10), fifteen (15) and twenty (20) MHz.

Briefly, FIGS. 1A-1D summarize basic multiple access methods well understood in the wireless transmission arts, and used throughout this disclosure. In these figures, it will be recognized that time increases in the direction of a time axis (t), and frequency increases in the direction of a frequency axis (F).

FIG. 1A is a first time-frequency diagram illustrating a TDMA (time division multiple access) system. In TDMA, each mobile radio terminal may use the whole frequency band provided for the usage by the mobile radio terminals. However, for each mobile radio device, only a predefined transmission time interval (TTI) is allocated in which the mobile radio device may send and receive useful data. During a transmission time interval 102, only one mobile radio device is active in a radio cell.

Figure 1B:
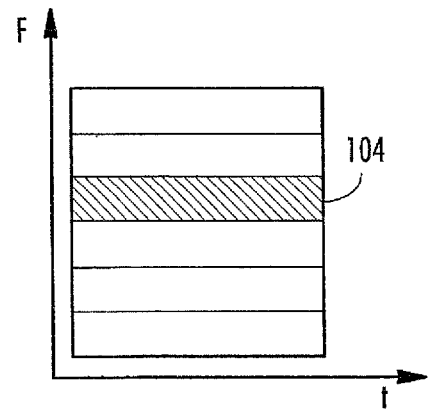
FIG. 1B is time and frequency plot of a typical prior art Frequency Division Multiple Access (FDMA) implementation.

FIG. 1B is a second time-frequency diagram illustrating a FDMA (frequency division multiple access) system. In FDMA, each mobile radio device may freely use the time domain, but only a predefined (narrow) frequency band 104 within the entire frequency band is available for sending and receiving useful data. Only one mobile radio device is active in each narrow frequency band of the radio cell at any given time.

Figure 1C:
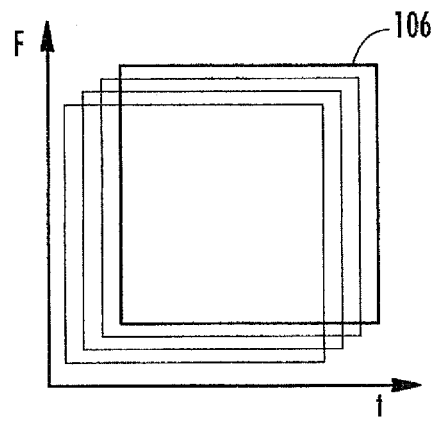
FIG. 1C is time and frequency plot of a typical prior art Code Division Multiple Access (CDMA) implementation.

FIG. 1C is a third time-frequency diagram illustrating a CDMA (code division multiple access) system. In CDMA (a sub-species of so-called "direct sequence" or DS systems), each mobile radio terminal may send and receive useful data during any time period, and may use the entire available frequency band. In order to avoid interference between the data sent by different senders, each mobile radio device is allocated a binary pseudo-noise code pattern 106. The code patterns which are allocated to the different mobile radio terminals are ideally orthogonal, and data sent by a mobile radio terminal or to be received by the mobile radio terminal is coded ("spread") by the code pattern allocated to the mobile radio terminal.

Figure 1D:
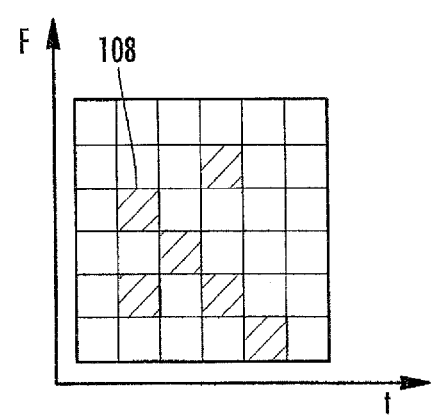
FIG. 1D is time and frequency plot of a typical prior art Orthogonal Frequency-Division Multiple Access (OFDMA) implementation used in combination with TDMA.

FIG. 1D illustrates an OFDMA (orthogonal frequency division multiple access) system in combination with TDMA. OFDMA is a special case of FDMA add is a multiple carrier method in which the entire frequency band having a bandwidth B is subdivided into M orthogonal sub-carriers 108. Thus, there are M (narrow) frequency bands each with a bandwidth of F=B/M. In OFDMA, a data stream to be sent is divided over a multiplicity of sub-carriers, and is transmitted (generally) in parallel. The data rate of each sub-carrier is accordingly lower than the overall data rate. For each mobile radio terminal, a defined number of sub-carriers 108 are allocated for data transmission. A chief advantage of OFDMA's flexible time-frequency resource allocation, over e.g., CDMA's flexible code allocation, is a higher spectral efficiency (i.e., more bits per unit time per unit of frequency bandwidth).

In LTE, downlink access based on OFDMA/TDMA data streams is subdivided in time to constant time intervals, or frames. Each frame is further subdivided into slots, and subframes. Not all subframes need to be in use (the network could be underutilized), but a subframe is the smallest incremental amount of time to be used for data transmission/reception with the transceivers. Once a transceiver has acquired the base station timing, subframes are allocated to each transceiver with a scheduling function.

Figure 2:
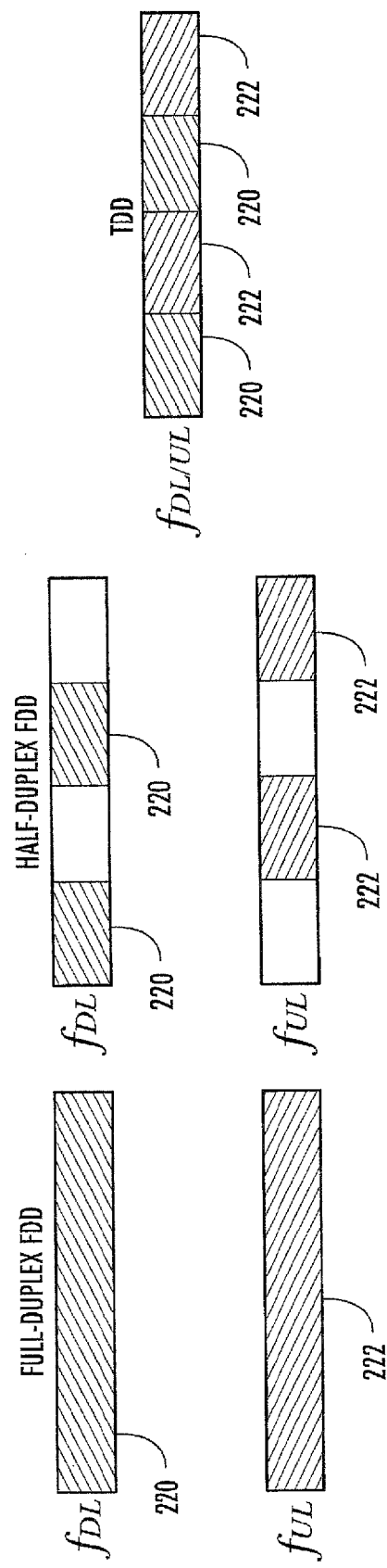
FIG. 2 is a graphical representation of various prior art duplex methods including full-duplex FDD, half-duplex FDD and TDD.

FIG. 2 illustrates the aforementioned full-duplex FDD, half-duplex FDD and TDD according to the prior art. Full-duplex FDD uses two separate frequency bands for uplink 222 and downlink 220 transmissions, where both transmissions can occur simultaneously. Unlike FDD, TDD uses the same frequency band for transmission in both uplink 222 and downlink 220; however within a given time frame, the direction of transmission is switched alternatively between the downlink 220 and uplink 222. Half duplex FDD uses two separate frequency bands for uplink 222 and downlink 220 transmissions, similar to full-duplex FDD, but uplink and downlink transmissions are non-overlapping in time (similar to TDD).

Figure 3:
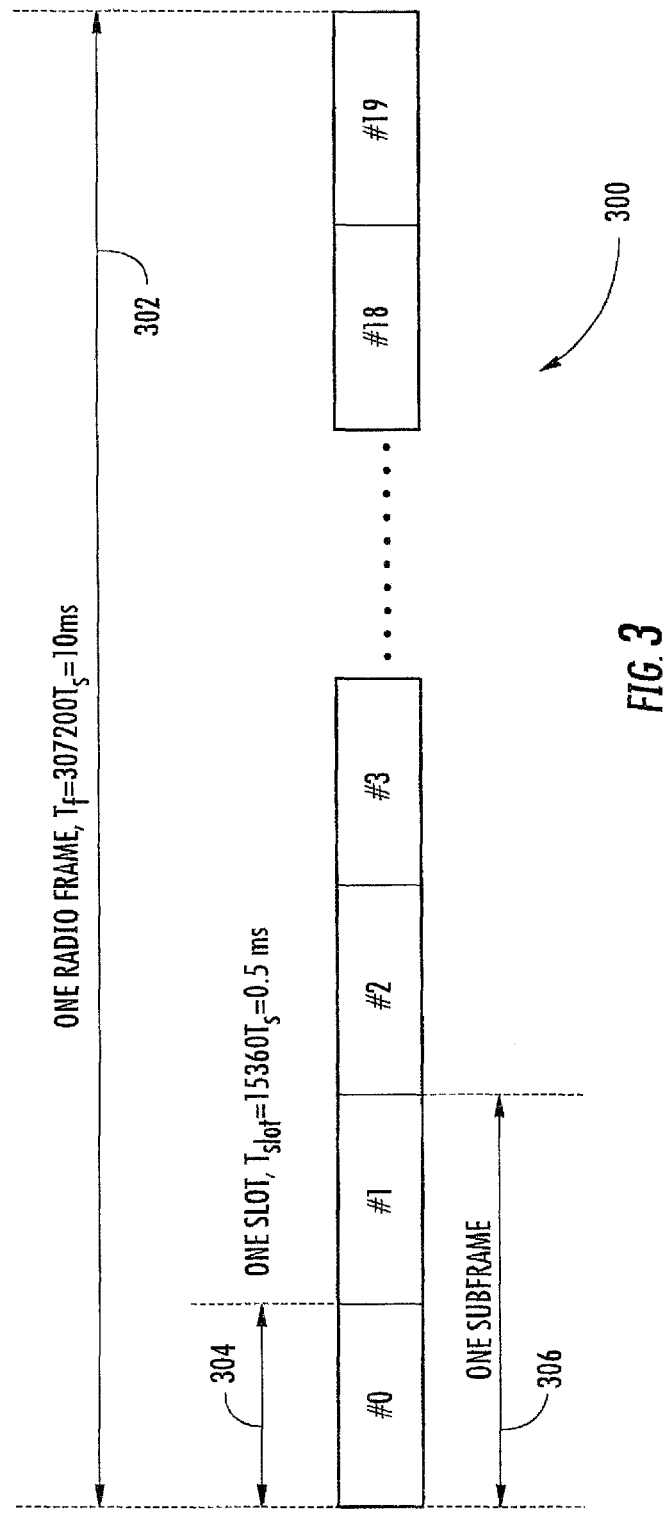
FIG. 3 is a graphical representation of an exemplary frame structure type for a prior art LTE FDD system.

LTE networks utilize a standard frame structure type 1 (one) 300 (as shown in FIG. 3) which is used in both full-duplex and half-duplex FDD. Each radio frame 302 is ten (10) ms in duration, and consists of twenty (20) slots 304 in 0.5 ms length intervals, numbered from 0 to 19. A subframe 306 is defined as two (2) consecutive slots 304. For FDD, ten (10) subframes are available for downlink transmission and ten (10) subframes are available for uplink transmissions in each ten (10) ms interval. Uplink and downlink transmissions are separated in the frequency domain. Depending on the slot format, a subframe consists of fourteen (14) or twelve (12) OFDMA symbols in downlink, and fourteen (14) or twelve (12) SC-FDMA symbols in uplink, respectively. Details of frame structure and timing are described in 3GPP TS 36.211 entitled *"E-UTRA—Physical channels and modulation"*, the contents of which are incorporated herein by reference in its entirety.

Figure 4:
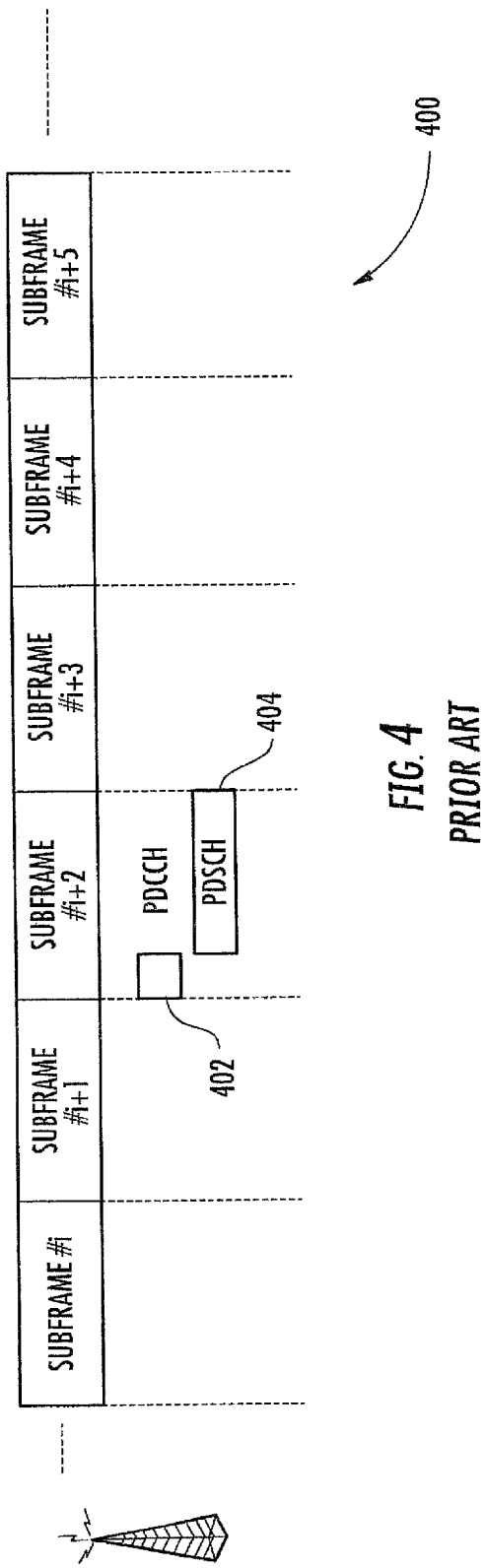
FIG. 4 is a graphical representation of a prior art LTE two-phase paging mechanism timing.

Referring now to FIG. 4, two-stage paging channel messaging 400 is illustrated for prior art LTE networks. In LTE networks, the first OFDMA symbols are used for transmitting three (3) kinds of "control channels": the PCFICH, PDCCH, and PHICH. The "Physical Control Format Indicator Channel" (PCFICH) indicates the format of the Physical Downlink Control Channel (PDCCH). The PDCCH carries, inter alia, resource assignments and paging messages. The Physical HARQ Indicator Channel (PHICH) is used for acknowledging or not-acknowledging (ACK/NACK) data received from the mobile device in the Physical Uplink Shared Channel (PUSCH). Each of these control channels are divided in groups of four (4) subcarriers and spread over the entire LTE system bandwidth.

As shown, the UE monitors the Physical Downlink Control Channel (PDCCH) 402 at defined time instants (i.e., defined subframes of length 1 ms). A paging identifier is assigned to the UE by the network. When the assigned paging identifier is decoded on the PDCCH, the UE decodes the associated Physical Downlink Shared Channel (PDSCH) 404. As shown, the PDCCH is transmitted in subframe #i+2; occupying one (1), two (2), or three (3) OFDMA symbols of the first slot, where the number of symbols is dynamically adjusted by network. The PDSCH 404 is transmitted in the remainder of subframe #i+2, and occupies the OFDMA symbols in the subframe that are not used by the PDCCH, PCFICH or PHICH.

Improvements For Long Term Evolution-Advanced (LTE-A)—

Within the framework of existing LTE architectures and access methods, incipient LTE-A proposals will continue to expand the versatility of existing LTE operation, by providing bandwidths up to 100 MHz with spectrum aggregation. For example, the bandwidth of an LTE-A cell may be composed of any number of spectral slices hereinafter referred to as "Component Carriers" (CC). However, in order to maintain backward compatibility between LTE and LTE-A networks (i.e., an LTE-A eNodeB must also support LTE user equipment), each CC is maximally limited to 20 MHz (a LTE limitation).

Figure 5:
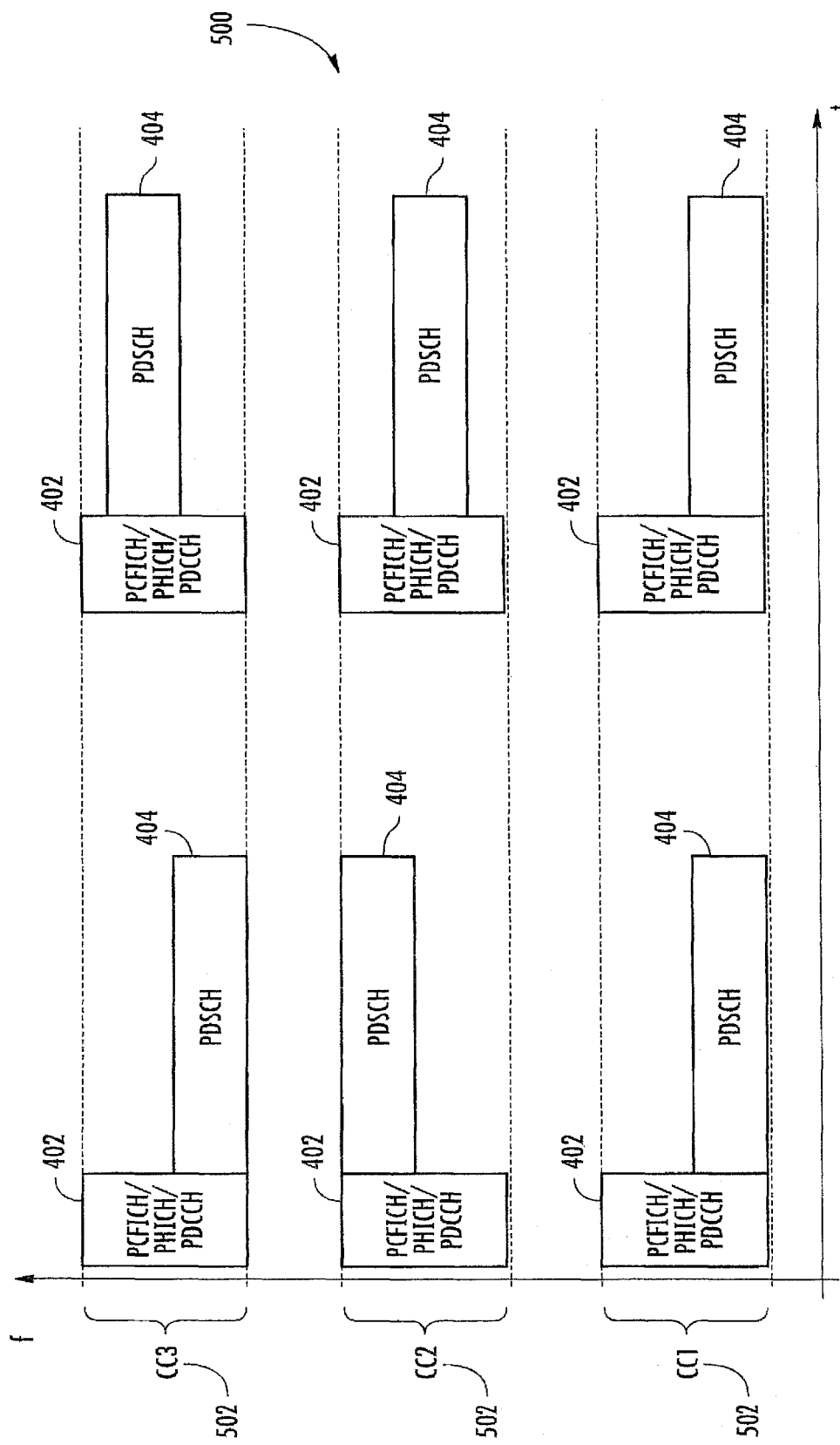
FIG. 5 is a graphical representation of the timing of a prior art LTE-A two-phase paging mechanism.

FIG. 5 is a graphical illustration of one prior art LTE-A schedule of the two-stage paging channel messaging 500, shown with respect to frequency and time. In LTE-A, the component carrier in LTE-A is equivalent to the entire system bandwidth of an LTE system. For example, in LTE-A, the bandwidth of each CC 502 may span up to twenty (20) MHz of bandwidth. Several CCs are offered simultaneously by the LTE-A cell, covering a much larger aggregate bandwidth. LTE-A UEs may use several CCs simultaneously whereas LTE UEs can use only the equivalent of one (1) CC at a time. This channel structure retains full backward compatibility for LTE UEs, while enabling much larger bandwidth possibilities for LTE-A UEs.

While the proposed enhancements for LTE-A greatly benefits UEs with ongoing connections, these same enhancements have undesirable repercussions for unconnected UEs. During "idle" mode (i.e., when the UE is not connected to the network), the UE must periodically check the paging channel for status updates e.g., pending calls, Short Messaging Service (SMS), data updates, etc. However, since there is no ongoing dialog established between the UE and the radio access network during idle modes, the UE and the eNB may not necessarily agree on paging channel parameters. Thus, the UE must check all paging channels on all possible CC slices. Similarly, the tracking area eNBs of the radio access network must actively broadcast paging channel messages on any suitable CCs. These CCs are hereinafter referred to as "active Component Carriers (CCs)". In some implementations, a CC may be excluded from paging operation (such non-active CCs are oily used if the eNB assigns the resources to a LTE-A UE). Excluded CCs are not compatible with LTE UEs. Clearly, both receiving and transmitting a simple paging message over large expanses of spectrum is not optimal.

Figure 6:
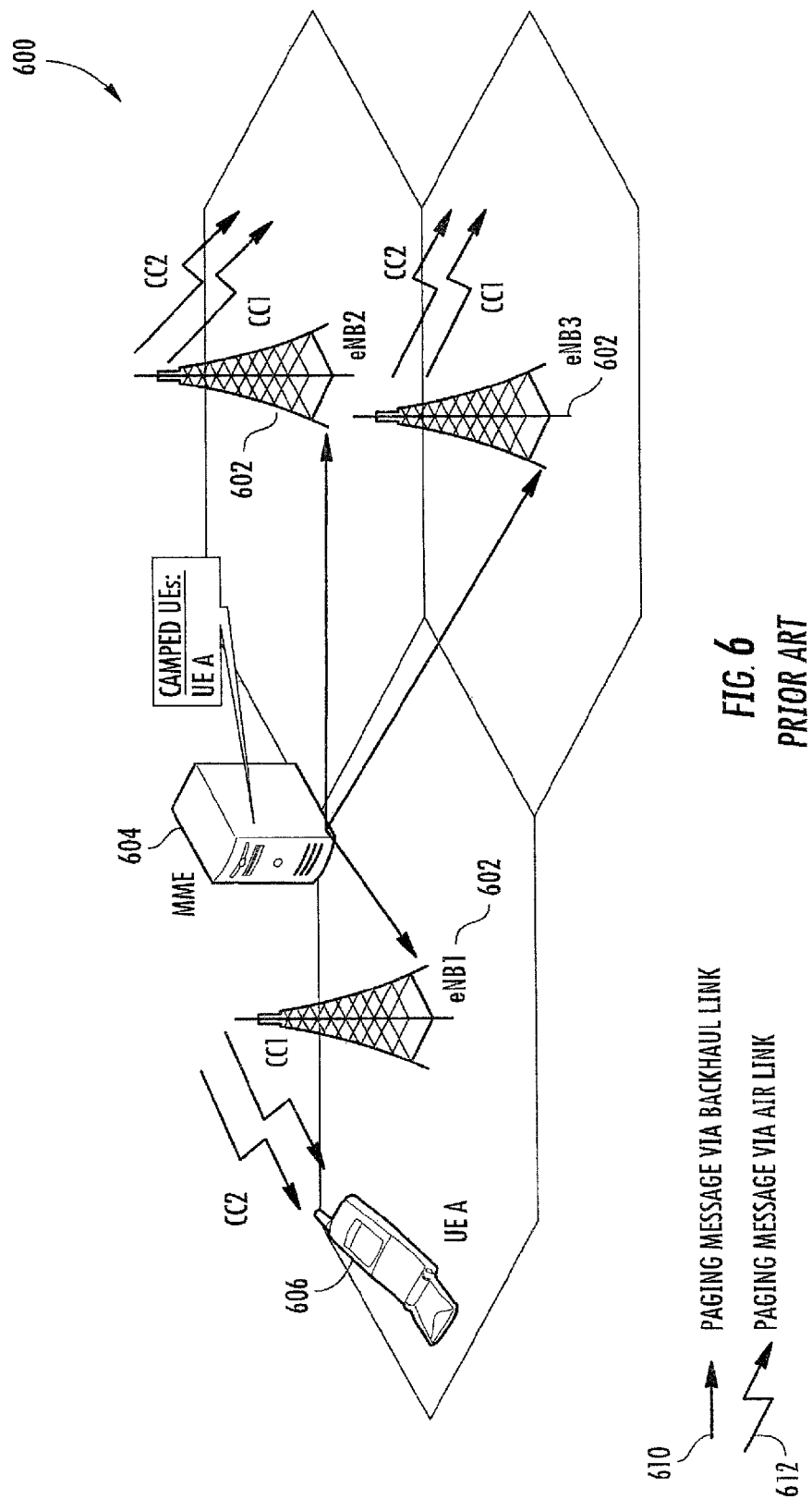
FIG. 6 is a graphical illustration of a prior art cellular system transmitting paging notifications to a mobile device.

FIG. 6 further illustrates the previously mentioned deficiencies of the prior art paging channel transmission 600. As shown, the tracking area (TA) consists of three (3) eNBs 602: eNB1, eNB2, and eNB3. The three eNBs have a backhaul connection to a Mobility Management Entity (MME) 604, where the MME maintains a listing of all currently known UEs within the TA (including UE1 606). To initiate a data transmission, the MME transmits a network page 610 via the backhaul to each of the eNBs of the TA. Responsively, each eNB transmits a paging notification to the UE on their active CCs (air interface paging channel message 612).

As a brief aside, the terms "paging message", "paging notification", "paging channel message", etc. have generally been used heretofore interchangeably. Prior art terminology does not differentiate between the various incarnations of the paging message (from generation within the Core Network to reception at the User Equipment). However, in the following discussions, the aforementioned interpretation is imprecise and may be potentially confusing. Thus, as used hereinafter, the terms "paging request" and "network page" refer to the page-related messaging between the central network entity (e.g., the MME) and the intermediary serving device (e.g., eNB). In contrast, the terms "paging Message", "paging notification", "paging channel", "paging transmission" refer to the page-related messaging sent via the air interface from the intermediary serving device to the mobile device. The terms "paging mechanism", "paging", and "paged" refer to the overall paging process, and does not imply limitation to either the network or air interfaces.

Referring back to FIG. 6, in the prior art paging transmission system 600, UE1 606 receives the paging channel message 612 from eNB1 602. The paging channel messages transmitted by the other eNBs (eNB2, eNB3) are wasted, and consume precious radio resources. Even within the coverage of eNB1, the UE receives paging messages on each CC of eNB1. The UE only needs to receive a single paging channel message; thus, the duplicative paging channel messages are gratuitous as well.

Example Operation—

The following discussion illustrates various useful aspects of the present invention for optimizing paging mechanisms, based on user context information.

Figure 7:
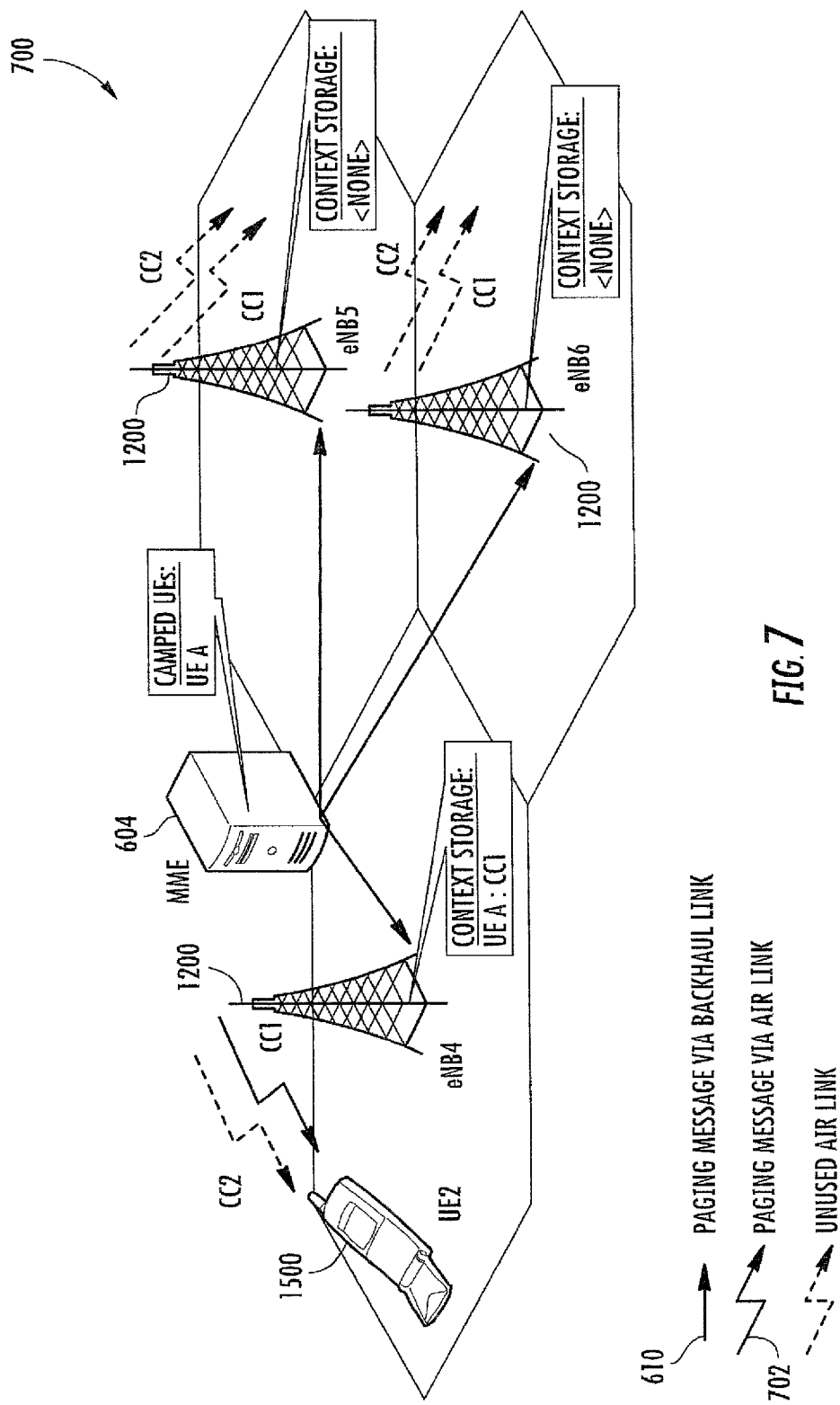
FIG. 7 is a graphical illustration of an exemplary cellular system transmitting paging notifications to a mobile device, in accordance with one embodiment of the invention.

FIG. 7 depicts one exemplary embodiment of a paging system 700 according to the invention. As shown, the tracking area (TA) consists of three (3) eNBs 1200: eNB4, eNB5, and eNB6. The three (3) eNBs have a backhaul connection to a Mobility Management Entity (MME) 604, where the MME maintains a listing of all currently known UEs within the TA (including the invention-enabled UE2 1500).

Upon initial detection of a nearby suitable eNB4 1200, or during subsequent context information changes, the UE2 1500 transmits a first update message to the eNB4, the update message contains context information (e.g., various supported options, timer options, etc.) useful for creating a paging agreement. In response to the update message, the eNB4 transmits an acknowledgment message (e.g., selection of one or more options, timer settings, etc.). Once the acknowledgement message is received, the two parties have finalized the paging agreement, notably without network assistance (the entire transaction occurs between only the UE2 and the eNB4, without requiring higher Core Network participation). The paging agreement identifies the active CC that the eNB4 and UE2 will use for paging channel messages.

To ensure validity of the paging agreement, the UE2 and eNB4 periodically refresh the paging agreement, using in one variant a "heartbeat" or "service pulse" message, A "watchdog" timer triggers corrective action if a heartbeat is missed; a missed heartbeat could either indicate momentary radio link interference, or alternatively, termination of the paging agreement. In this scenario, if the UE (UE2) does not refresh the timer, then the eNB4 assumes that the UE2 has moved to another eNB (eNB5, eNB6) within the TA, and deletes the UE2's record.

As described in greater detail hereinafter, the context information may arbitrarily change. Changes to context information may or may not have an impact on the paging agreement. Notification of context change may be signalled via the described update or acknowledge messages. The eNB4 stores the context information for each UE2, and if necessary alters the paging agreement. Such changes can be triggered by the eNB4 (e.g. the CC should no longer be used by UEs in idle mode, etc.), or by the UE2 (e.g. in case it detects a CC which is more suitable, etc.).

During a page, the MME 604 transmits a network page 610 via the backhaul to each of the inventive eNBs of the TA. In contrast to the prior art scheme 600 of FIG. 6, each of the invention-enabled eNBs 1200 locally retains context information and paging agreements regarding the UEs 1500 within their coverage area (generally a subset of the tracking area). Consequently, upon receiving the network page, each eNB consults its internal database of current context information. If the paged UE does not match any of their recorded UEs, then the network page 610 is ignored. If the eNB has a successful match, then the eNB transmits a paging channel message 702. Thus, only eNB4 transmits a paging channel message 702 to the invention enabled UE2 1500 via the proper CC; all other eNBs radio resources are free for other tasks, thereby improving overall network efficiency.

Moreover, the foregoing embodiment advantageously is fully backward compatible solution with existing LTE and/or LTE-A networks. For example, existing MME 604 and associated messaging interfaces can remain unchanged. Also, invention-enabled eNBs 1200 can be freely interspersed with legacy eNBs 602, as the paging scheme described herein does not require (but none-the-less can utilize if desired) cooperation between base stations. Similarly, eNBs 1200 and UEs 1500 configured according to the present invention may freely mingle with their legacy counterparts by using revision information (included in one embodiment within context information records).

Methods—

Figure 8:
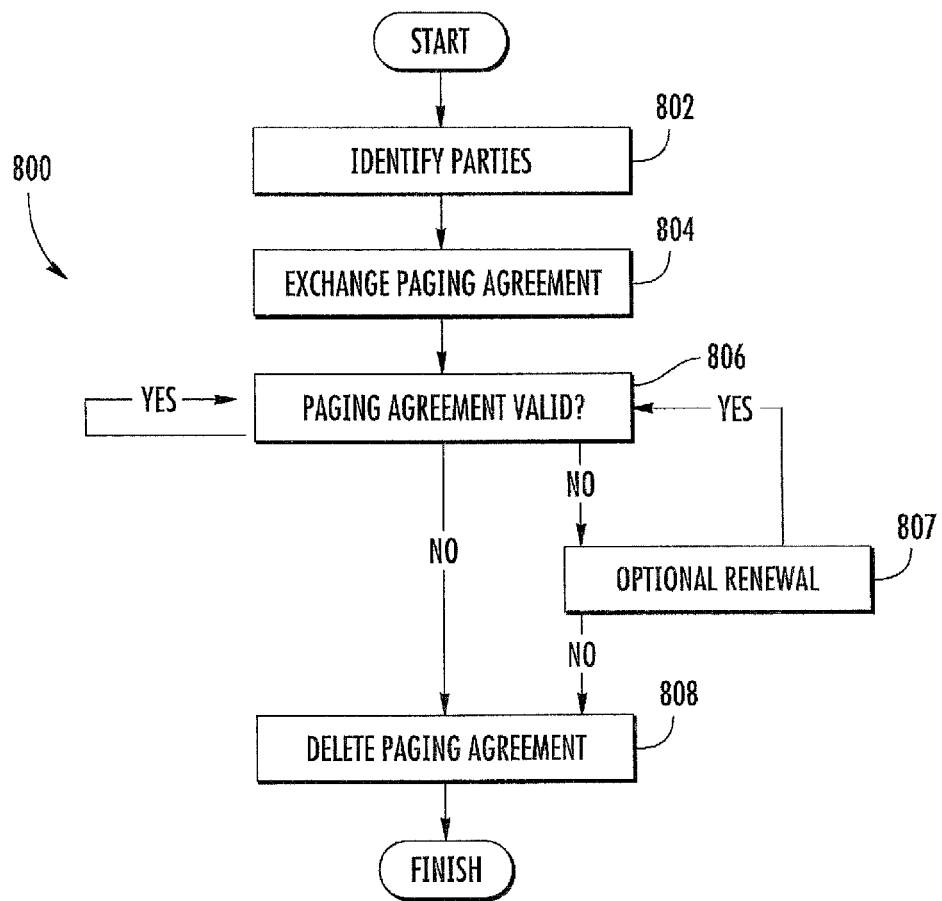
FIG. 8 is a logical flow diagram of one exemplary embodiment of the generalized method for establishing and maintaining paging agreement in accordance with the invention.
Figure 10:
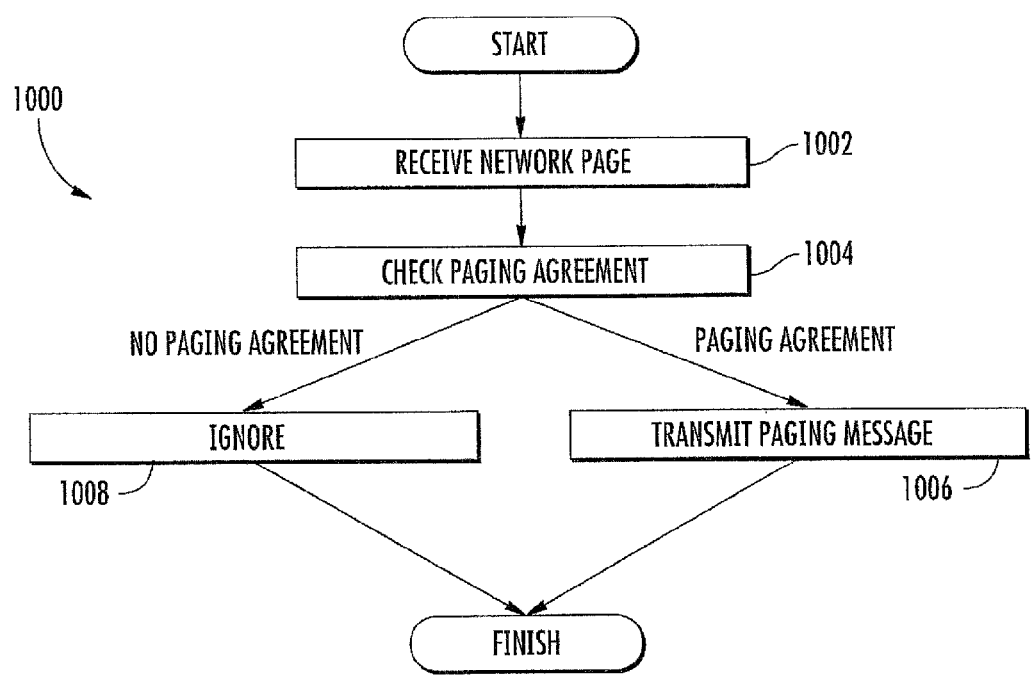
FIG. 10 is a logical flow diagram of one exemplary embodiment of the generalized method for efficiently using context information to transmit paging channel messages, in accordance with the invention.

FIGS. 8 and 10 are logical flow diagrams illustrating two (2) distinct aspects of wireless paging based on context information, in accordance with exemplary embodiments of the present invention. FIG. 8 generally describes processes for updating the context information and/or paging agreements of wireless devices operating within a wireless network. FIG. 10 broadly characterizes paging mechanisms that exploit a paging agreement.

Establishing, and Maintaining Paging Agreement—

FIG. 8 illustrates a generalized method for maintaining paging agreement between multiple parties in a cellular radio system. Specifically, as shown in the method 800 of FIG. 8, the participating parties are first identified at step 802. In one exemplary embodiment, a first mobile device identifies one or more second base station devices. Such identification may be based on a publicly broadcast signal, such as a pilot channel, broadcast channel, etc. For example, LTE radio access networks publicly broadcast system information in System Information Blocks (SIB), or Master Information Blocks (MIB). An enabled UE 1500 decodes the SIBs of nearby eNBs (1200, 602). If the eNB supports enhanced paging channel operations (in accordance with the present invention) then the UE proceeds to step 804. Otherwise, the UE resumes legacy idle mode procedures. Similar methods are applicable for the eNBs, for example, an eNB that receives an enhanced message from an UE (e.g. a "Tracking Area Update"), may configure itself for enhanced paging procedures. If the eNB receives a legacy message from the UE, then it reverts to legacy paging procedures.

Moreover, in certain crowded networks, the mobile device may detect several candidate base stations. Conceivably, the candidate base stations may have a wide array of capabilities, spanning various gradations from legacy, enhanced, and perhaps even future incarnations of other paging channel operations. Accordingly, in certain implementations, the mobile device can select one or more of the candidate base stations for context information exchange, and paging agreement (step 804).

In other embodiments, the one or more second base station devices identify the first mobile device. Such identification may be performed by checking one or more device attributes. For example, a mobile device within the coverage of a base station may be queried for enhanced paging channel capabilities. Similarly, in other variations, the base station may discover enhanced mobile device operation via other methods e.g., out-of-band signaling, communication with a network management entity, etc.

The most efficient usage of network resources would dictate the fewest number of radio resources (e.g., a CC) to robustly transmit a paging message to the mobile device. Thus, in one embodiment, the identified parties agree on a number of radio resources for paging transmission. For example, in cases of very clear reception, perhaps only a single eNB transmitting paging messages on a single CC is sufficient. In contrast, in cases of muddled reception (due to e.g., high-fade environments, very high user density, etc.), multiple base stations may be required to use one or more CCs to transmit paging notifications.

At step 804, the identified parties exchange context information and/or paging Agreements. In LTE networks, a reliable exchange of context information is conducted over an established connection. LTE networks only support a single Radio Resource Connection (RRC) for any at any time. In most cellular systems, connection establishment requires significant amounts of control layer signaling including authentication, authorization, registration, etc. Each of these network transactions would be duplicated for each base station the mobile device exchanges context information with. Accordingly, in alternate embodiments of the present invention, the device transmits a simple update message containing its context information, to each member of the Tracking Area (TA) without connection establishment. Such an embodiment would reduce the necessary requirements for control layer signaling.

In certain radio access technologies, network connection is much simpler. Thus, in some embodiments, context information may be preferably exchanged using network connections. For example, ad hoc networking generally provides radio connection to IP-based networks (Internet Protocol), without requiring complex registration procedures. Similarly, future home networking applications may IP-based services (Internet Protocol) over several coexisting wireless protocols, thus the same IP user identity (e.g., Bluetooth, Wi-Fi, etc.) may not have any common identity shared across radio platforms. In such heterogeneous environments, a connection must be established to link the higher IP-based user identity with lower radio layer attributes.

Context information may include, but is not limited to: identity of the UE, radio resources (such as component carriers (CC), frequency hands, time slots, etc.), paging channel capabilities, last connected eNB (within the TA), listing of nearby eNBs, listing of eNBs of the TA, geographic data, received signal quality indicators, nearby cell identification, etc. In one minimal case, the context information consists of the identity of the UE, and the active CC.

In the exemplary embodiment, the mobile device provides its context information to the base station; however other radio network technologies may have bi-directional context information exchanges. Also, it will be appreciated that other types of context information may be substituted; the foregoing being merely illustrative. The manner and types of context information substituted are readily determined by those of ordinary skill in the art given the contents of the present disclosure.

In one embodiment, the context information is stored within the base station, using an internal database. Complementary databases may be used for mobile devices. In alternate embodiments, the context information may also be forwarded or messaged to other network entities, including nearby base stations, central network management entities, etc. The context information is generally static; however in some scenarios, various context information may dynamically change, and require updating (e.g., periodically or in response to the occurrence of a particular event). The context information is used and monitored by each of the apparatus to determine and/or update paging agreements. For example, a base station may track context information of multiple UEs to constantly optimize its radio resource utilization. Such variations would enable eNBs to track contexts balance UEs among CCs. Also, mobile devices may track context information for multiple eNBs, and selectively enter into agreements with other base stations.

In one implementation, an acknowledgment message is responsively transmitted to ensure that all parties are in agreement on context information. For example, once a base station has received context information from a mobile device, the base station transmits an acknowledgment message, indicating reception of the context information and finalizing a paging agreement. In some variants, the acknowledgement indicates acceptance of the message content, or alternately, selection of one or more context options.

Step 804 ends when the participant parties of the paging notification mechanism are in initial agreement (implicitly or explicitly) as to the paging agreement.

At step 806, the participant parties refresh the paging agreement to ensure continued agreement on the terms. In one exemplary embodiment, the paging agreement is refreshed using a periodic refresh message. If the refresh message is received within an expected period, then the paging agreement is renewed. If however, the refresh message is not received within the expected period, then the paging agreement is considered invalid. In one such variant, the paging agreement is thereafter discontinued, and the process automatically continues to step 808 to delete related records. In another such variant, the paging agreement is revived, and the process repeats step 806. The paging agreement may also be affirmatively discontinued (e.g., with an explicit message, which may include reasons or codes if desired).

As noted above, one embodiment of the invention refreshed the paging agreement at periodic or known intervals or time slots. For example, in the aforementioned scenario, the second base station sets a simple "watchdog" countdown timer having a first refresh period N. The first mobile device transmits a refresh message before the expiration of the watchdog timer. The first mobile device may use a periodic "heartbeat" timer having a second period O. Alternately, the mobile device may use an aperiodic refresh scheme (provided that the aperiodic refresh message satisfies the N period constraints).

Various systems may further dynamically update the refresh period N. For instance, in dynamically changing radio environments, the period N may be shortened for high noise environments, whereas low noise or stable environments may lengthen the period N. In systems which do not maintain a connection, the changing parameters (such as the N period) may the broadcast via other broadcast control channels (e.g., embedded within a System Information Block (SIB), Master Information Block (MIB), etc.).

Generally, shortening or lengthening of the refresh period N, also affects the second period O. The manner of the effect may or may not be directly related. For example, the mobile device may select a value O, shorter than N, but optimized for power consumption (e.g., minimizing the number of refresh messages sent). In contrast, the mobile device may select a value O for robustness to provide multiple refresh attempts before the expiration of the base station timer period N.

In other embodiments, the mobile device may transmit the refresh message irregularly or aperiodically, such as in an event-triggered manner. For instance, in one exemplary system, the mobile device only transmits a refresh message when triggered or queried by the base station. The base station may periodically broadcast a refresh request message; in response thereto, each mobile station within range transmits a refresh message. Alternatively, for paging notification systems where the base station and mobile station retain an active radio link connection, the base station transmits a refresh request message, and the mobile station transmits the refresh message.

In other variations, the refresh message may be triggered, based on other factors, such as environmental channel conditions, population of mobile devices, etc. For example, a mobile device may passively monitor broadcast channels (such as a pilot channel). When reception of the pilot channel fluctuates, refresh messages are resent. In another example, a base station may consider the number of close by mobile devices. As the number of mobile devices increases or decreases, the base station may request refreshes from nearby mobile devices, to prune devices which have fallen out of reception.

In yet another variation, the paging agreement is assumed valid unless a paging channel message is missed. Thus, a mobile device and base station agree on a paging agreement, which is assumed valid until proven otherwise. If the mobile device does not respond to a paging channel message, then the base station invalidates the paging agreement.

As previously mentioned, if the refresh message is not received within the expected period, then the paging agreement is invalid. However, in some embodiments, a revival procedure may be executed in optional step 807. If the system does not support revival, then the process immediately skips to step 808. Moreover, while generally it is easier for the transmitting party (e.g., base station) to determine that the paging agreement is invalid (due to a missed page, etc.), this does not preclude the receiving party (e.g., mobile device) from determining that the paging agreement is invalid. For example, a mobile device can monitor the nearby pilot channels. If a mobile device loses pilot channel reception, then the mobile device may safely assume that the paging channel would also be lost (the pilot channel is typically the easiest channel to receive). If the mobile device should happen to reacquire the pilot channel, it may proceed to step 807, to proactively revive the paging agreement.

At step 807, attempts are optionally made to revive a previously lost or invalid paging agreement. In one embodiment, the base station attempts multiple page messaging retries. After the watchdog timer has expired, the base station transmits a second paging channel message and restarts a restart timer P. At the expiration of the P timer, another retry may be attempted. The paging channel retries may be attempted any number of times; however, a maximum number of retries may prevent excessive network congestion.

In other embodiments, the community of base stations may switch to a legacy paging mode. For example, if the first base station is unable to page the mobile device, the base station may flag other base stations of the tracking area. Subsequently thereafter, the entire tracking area resumes legacy paging operation.

In a mobile device-initiated embodiment, the mobile device may transmit a refresh or update message upon re-engagement with a previously known base station. The base station resumes paging agreement operation, if it receives any out-of-sequence messaging.

Upon successful revival, the participants return to step 806. Unsuccessful revival attempts eventually proceed to step 808. Yet other methods and schemes for revival will immediately be recognized by persons of ordinary skill in the art, given the contents of this disclosure.

At step 808, the paging agreement is discontinued. In one embodiment, one or more parties of the paging agreement delete the paging agreement. For example, the base station may delete paging agreement for a mobile device. Thereafter, the mobile device must reinitiate a paging agreement with the base station. In other embodiments, the context information may be reserved for possible revival. For example, a mobile device may be able to revive its connection with the base station, if the base station can retrieve previously invalid context information, even if no current paging agreement exists.

Figure 9:
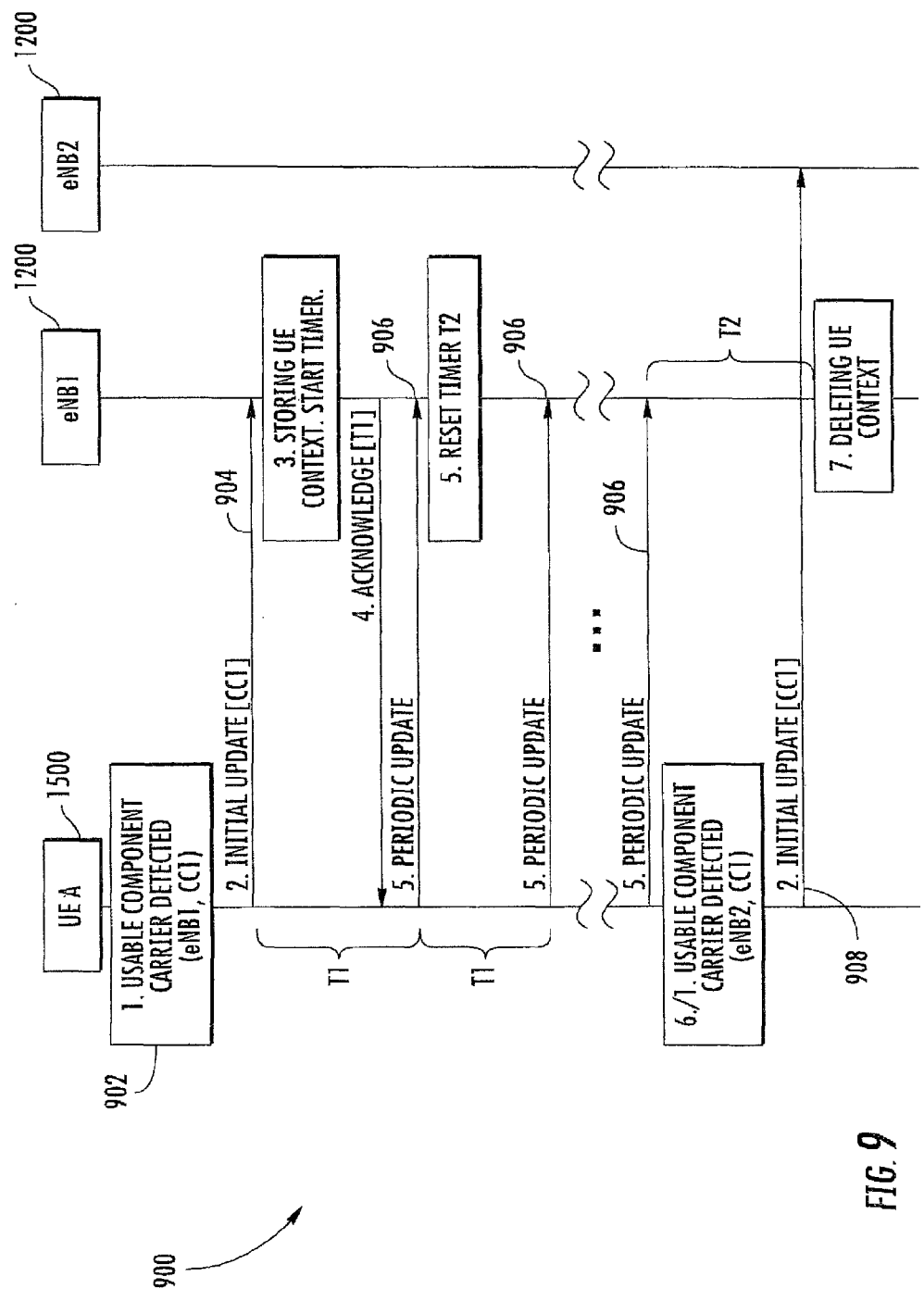
FIG. 9 is a ladder diagram further describing the methods for establishing paging agreement between multiple parties in a cellular radio system, in accordance with the generalized methods of FIG. 8.

One exemplary paging agreement transaction 900 is diagrammed in FIG. 9, further illustrating the paging agreement between multiple parties in a cellular radio system. As shown, the exemplary system includes a first UE A 1500, a first eNB1 1200, and a second eNB2 1200. The first UE A identifies nearby cellular base stations (for example, based on a pilot signature, etc.) at a first time 902. In the illustrated example, UE A preferentially selects the first eNB1 for exchanging context information, and paging agreement.

The UE A 1500 transmits a first update message to the first eNB1 1200 (904), the update message containing context information. The eNB1 stores the context information, generates a paging agreement and starts a watchdog timer (having a period T2). The first eNB1 also transmits an acknowledgement to the first UE A, formalizing the paging agreement. Periodically (every T1 where T1 is shorter than the base station's watchdog tinier), the UE A transmits a refresh message (906).

At a later time 908, the first UE A detects a second base station eNB2 (or determines that the second base station is more desirable than the first base station). The UE A initiates a paging agreement with the second eNB2 (1200). Shortly thereafter, the UE A stops refreshing the paging agreement. Once the watchdog timer expires, the first base station eNB1 terminates the context information and paging agreement.

Context Information Based Paging—

FIG. 10 illustrates one embodiment of the invention, specifically characterizing methods of paging channel operation that exploit device context information. In the following discussion, one or more second base station devices receive a network page from a network entity (such as a Mobility Management Entity (MME) 604). In response, each of the base stations individually determines if it should transmit a paging channel message to the mobile device. In some implementations, the mobile device receives paging channel messages from multiple base stations. The first unique paging message may be answered, whereas subsequent duplicative paging messages are ignored. In alternate embodiments, the mobile device may selectively respond one of the received paging messages, preferentially (e.g., such as to improve signal quality, match device considerations, optimize service considerations, etc.).

The network page and network entity may be optionally modified for operation with the disclosed base stations. In one embodiment, the base station determines the appropriate response without further consulting external network entities. In contrast, it is appreciated that the base station may have supplemental interfaces, or modified interfaces with future network devices, so as to further improve network operation.

Moreover, while the following process is described in the context of a cellular network, it is appreciated that the process is equally adaptable to other wireless protocols, and systems. In fact, it is envisioned that heterogeneous network structures may be configured to support a unique identity responding to multiple radio access technologies. The following process appropriately allows each of the mixture of access points to independently transmit paging messages to the device.

At step 1002 of the method 1000 of FIG. 10, the one or more page transmitting devices receive a network page from a central network authority. In one exemplary embodiment each eNB 1200 of a specified tracking area receives a network page from a MME 604. Alternatively, the network page may be forwarded from a peer entity (e.g., similar to a rerouting mechanism). For example, a first base station of a tracking area may enable other base stations (that have less recent context information) for secondary paging transmission retries.

At step 1004, the page transmitting device considers the network page with reference to an internal database of context information. The internal database of context information returns corresponding context information (if available) and any paging agreements (if valid), when provided with a device specific identifier. Consequently, if the network page addresses a device specific identifier that has a valid paging agreement, then the base station generates the paging channel message in accordance with the context information (step 1006). If the network page does not return a current paging agreement, then the page transmitting device ignores the network page (step 1008).

At step 1006, the page transmitting device transmits the paging channel message. In one embodiment, successful response to the paging channel message (i.e., the page receiving device answers), refreshes the paging agreement. Successful response restarts the watchdog timer. In other implementations, successful response to the paging channel message is distinct from refreshing the paging agreement. Unsuccessful page transmission may also be used as a precondition or trigger for reversion to legacy paging operation, or alternatively triggering revival of the paging agreement.

In contrast to step 1006, during step 1008, the page transmitting device ignores the network page. In one embodiment, the network page is queued for subsequent transmission in the event of a failure. For example, if the initial attempts by a primary base station fail, other secondary base stations may transmit the same paging message to augment the primary base station. In another example, the paging mechanisms of the present invention revert to legacy operation (all base stations of the TA), if the paging mechanism fails.

Figure 11:
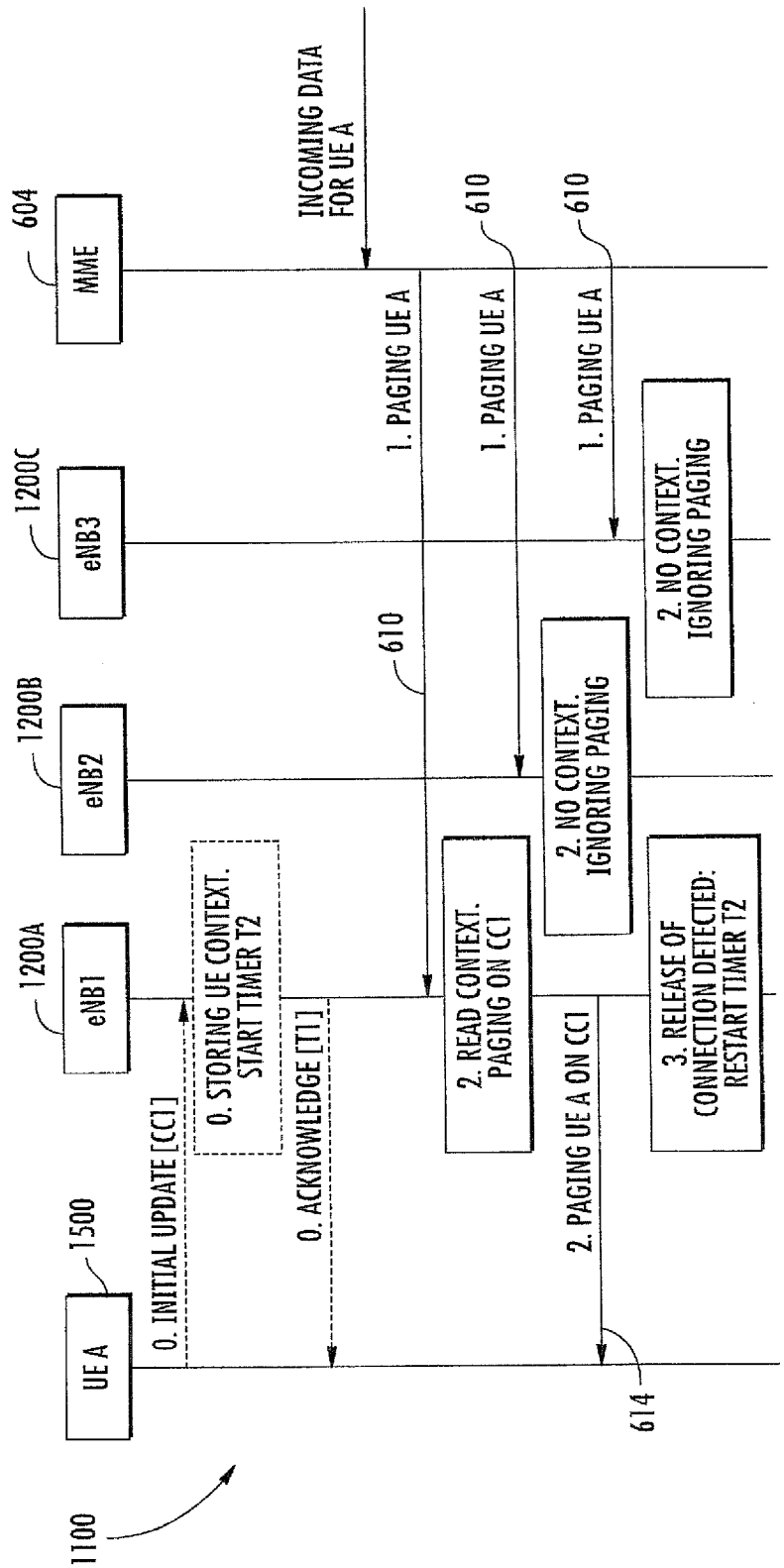
FIG. 11 is a ladder diagram further describing the methods for paging a mobile device using context information, in accordance with the generalized methods of FIG. 10.

One exemplary paging channel transaction 1100 according to the invention is diagrammed in FIG. 11, depicting the paging channel transactions of a mobile device using multiple base stations in a cellular radio system. As shown, the exemplary system includes a first UE A 1500, a first eNB1 1200A, a second eNB2 1200B, a third eNB3 1200C, and a central network authority MME. The first, second, and third base stations are addressed as a tracking area. Initially, the UE A negotiates a paging agreement with the first eNB1 (see e.g., the procedure 900 of FIG. 9).

The MME 604 receives data addressed to the first UE A. The MME 604 generates a network page for UE A 1500, and transmits the network page 610 to the current tracking area (eNB1, eNB2, eNB3); each base station of the tracking area receives a paging request. Responsively, each base station checks for a valid paging agreement, and uses corresponding context information to generate the paging channel message 612. As shown in FIG. 11, only the first eNB1 1200A transmits the paging channel message 612. During the message exchange UE A and eNB1 have an active dialog, thus in this example, the watchdog timers can be suspended (i.e., the paging agreement remains valid). Once the connection has been released, the paging agreement watchdog timers are resumed.

Exemplary Base Station Apparatus—

Figure 12:
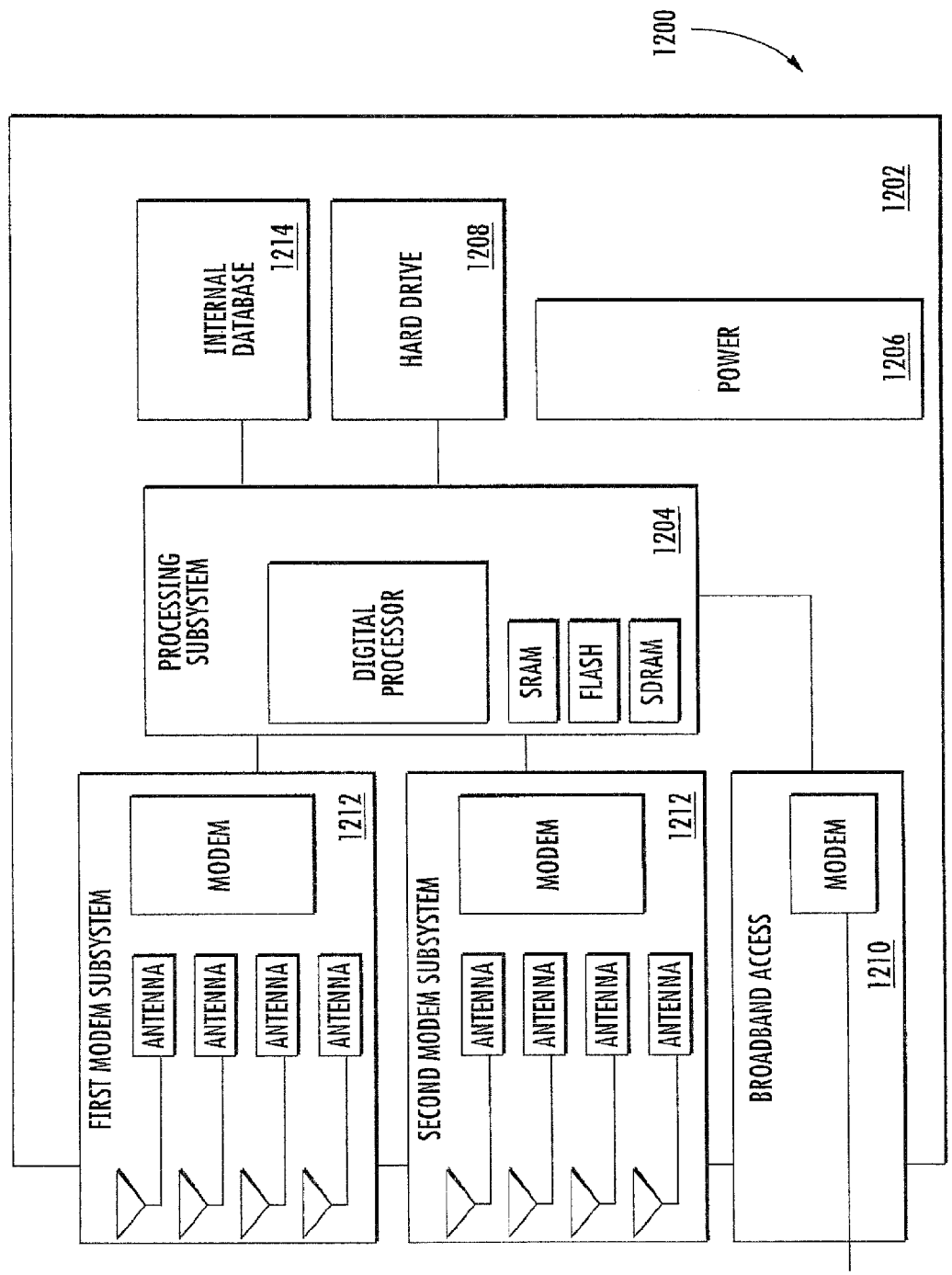
FIG. 12 is a functional block diagram illustrating one embodiment of a base station apparatus adapted to implement the methods of the present invention.

Referring now to FIG. 12, exemplary base station apparatus 1200 useful in implementing the functionality previously described above is illustrated and described. The base station apparatus 1200 of the illustrated embodiment generally takes the form factor of a stand-alone device for use in a cellular network, although other form-factors (e.g., femtocells, picocells, access points, components within other host devices, etc.) are envisaged as well. The apparatus of FIG. 12 includes one or more substrate(s) 1202 that further include a plurality of integrated circuits including a processing subsystem 1204 such as a digital signal processor (DSP), microprocessor, PLD or gate array, or plurality of processing components, RF transceiver(s), as well as a power management subsystem 1206 that provides power to the base station 1200.

The processing subsystem 1204 includes in one embodiment an internal cache memory, or a plurality of processors (or a multi-core processor). The processing subsystem 1204 is preferably connected to a non-volatile memory 1208 such as a hard disk drive (HDD), as well as a memory subsystem which may comprise SRAM, Flash, SDRAM, etc. The memory subsystem may implement one or more of DMA type hardware, so as to facilitate rapid data access.

The exemplary apparatus 1200 will, in some embodiments, implement some form of broadband access. In the illustrated embodiment, the broadband access is provided by a DSL connection (i.e., via DSL subsystem 1210), although other interfaces, whether wired or wireless, may be used in place of or in combination with the DSL subsystem 1210 shown. The digital portion of DSL processing may either be performed in the processor 1204, or alternatively in a separate DSL processor (not shown). Further, while a DSL broadband connection is illustrated, it is recognized by one of ordinary skill that other broadband access schemes such as DOCSIS cable modem, T1 line, WiMAX (i.e., IEEE Std. 802.16), ISDN, FiOS, microwave link, satellite link, etc. could be readily substituted or even used in tandem with the aforementioned DSL interface. DSL has the advantage of being low cost and generally ubiquitous, and carried over copper-based telephony infrastructure which is currently widely distributed throughout the population.

In one exemplary embodiment, the base station should seamlessly operate with legacy MME apparatus 604 of the core network. In one such embodiment, the base station and MME are connected via the broadband type interface 1210.

The base station apparatus 1200 also includes one or more RF modem subsystems. The modem subsystems 1212 enable the base station to provide service to one or more subscriber devices. It is readily appreciated that in some implementations of the invention, multiple subsystems may be required. For example, a base station may provide multiple RF modem subsystems to provide, inter alia, multi-mode operation (e.g. GSM, GPRS, UMTS, and LTE) over multiple distinct air interfaces. The modem subsystems 1212 include a digital modem, RF frontend, and one or more antennas.

It is further noted that in some embodiments, it may be desirable to obviate some of the components presently illustrated (such as RF frontend), or alternatively, the discrete components illustrated may be merged with one another to form a single component.

Figure 13:
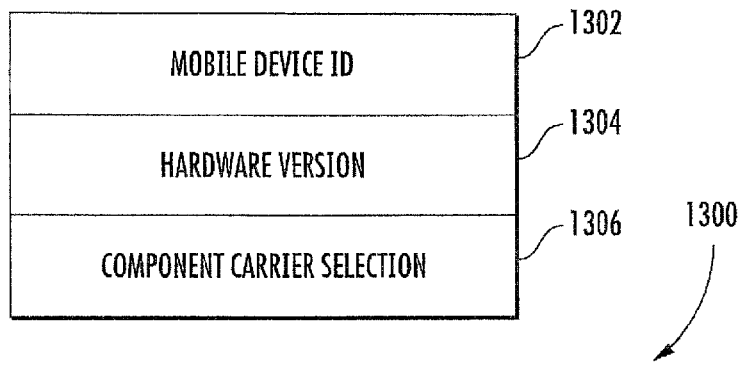
FIG. 13 is a graphical representation of one embodiment of an update message format containing context information, in accordance with the principles of the present invention.

As noted above, exemplary implementations of the invention utilize paging agreement and context information for optimized paging channel operation. In one such implementation, a paging agreement including one or more context information details is referenced to a unique or semi-unique user identity. For instance, the base station receives an update message via the wireless interface. FIG. 13 illustrates one exemplary update message 1300 containing: (i) mobile device identity 1302, (ii) hardware version 1304, (iii) one or more suggested Component Carriers 1306, etc.

The base station generates a paging agreement by selecting a set of parameters from the context information. In other variants, the base station accepts or overrides default parameters.

Figure 14:
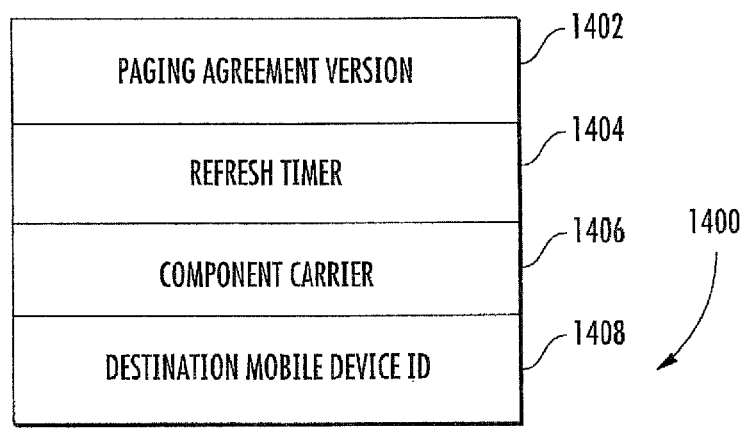
FIG. 14 is a graphical representation of one embodiment of an acknowledgement message format containing a paging agreement, in accordance with the principles of the present invention.
Figure 14A:
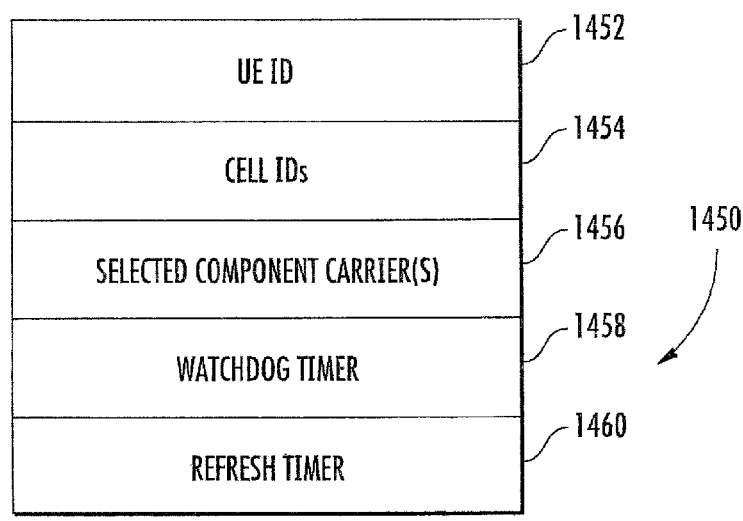
FIG. 14A is a graphical representation of one embodiment of a paging agreement entry stored at one exemplary eNB, in accordance with the principles of the present invention.

FIG. 14 illustrates one exemplary acknowledgement message containing: (ii) paging agreement version 1402, (iii) refresh timer period 1404, (iv) one or more Component Carriers 1406, (v) intended mobile device ID 1408, etc. FIG. 14A illustrates one exemplary paging agreement entry 1450 stored at the eNB. The paging agreement entry includes the (i) UE ID 1452, (ii) cell ED 1454 (if several cells are operated by the eNB), (iii) selected CC 1456, (iv) the watchdog timer period 1458, and (v) an optional refresh time period 1460.

In some simple variants, the acknowledgement message is an acceptance or denial of the context information.

The base station apparatus stores the paging agreement and related context information within an internal database, referenced by mobile device identity. The entries of the database are valid for use, according to a watchdog timer (set to the refresh timer period). The watchdog timer operation is set and reset, responsive to "heartbeat" messaging from the associated mobile device. In some configurations, if the watchdog timer has expired, the entries are deleted. In alternate configurations, the expiration of the timer triggers revival attempts.

The base station apparatus 1200 of FIG. 12 further includes apparatus for conditional paging transmissions for a mobile device, based on the validity and contents of the internal database. Responsive to receiving a network page from the MME 604 (coupled to the network interface 1210), the base station apparatus references the internal databases for current, valid records having the same unique or semi-unique mobile device identifier. If a suitable record exists, then the base station apparatus generates and transmits a paging channel message in accordance with the appropriate context information, (e.g., specified Component Carriers, etc.)

Other variants of the internal database operation, timer implementations, context information, and conditional paging transmissions are readily implemented by an artisan of ordinary skill, given the present disclosure.

Exemplary Mobile Apparatus—

Figure 15:
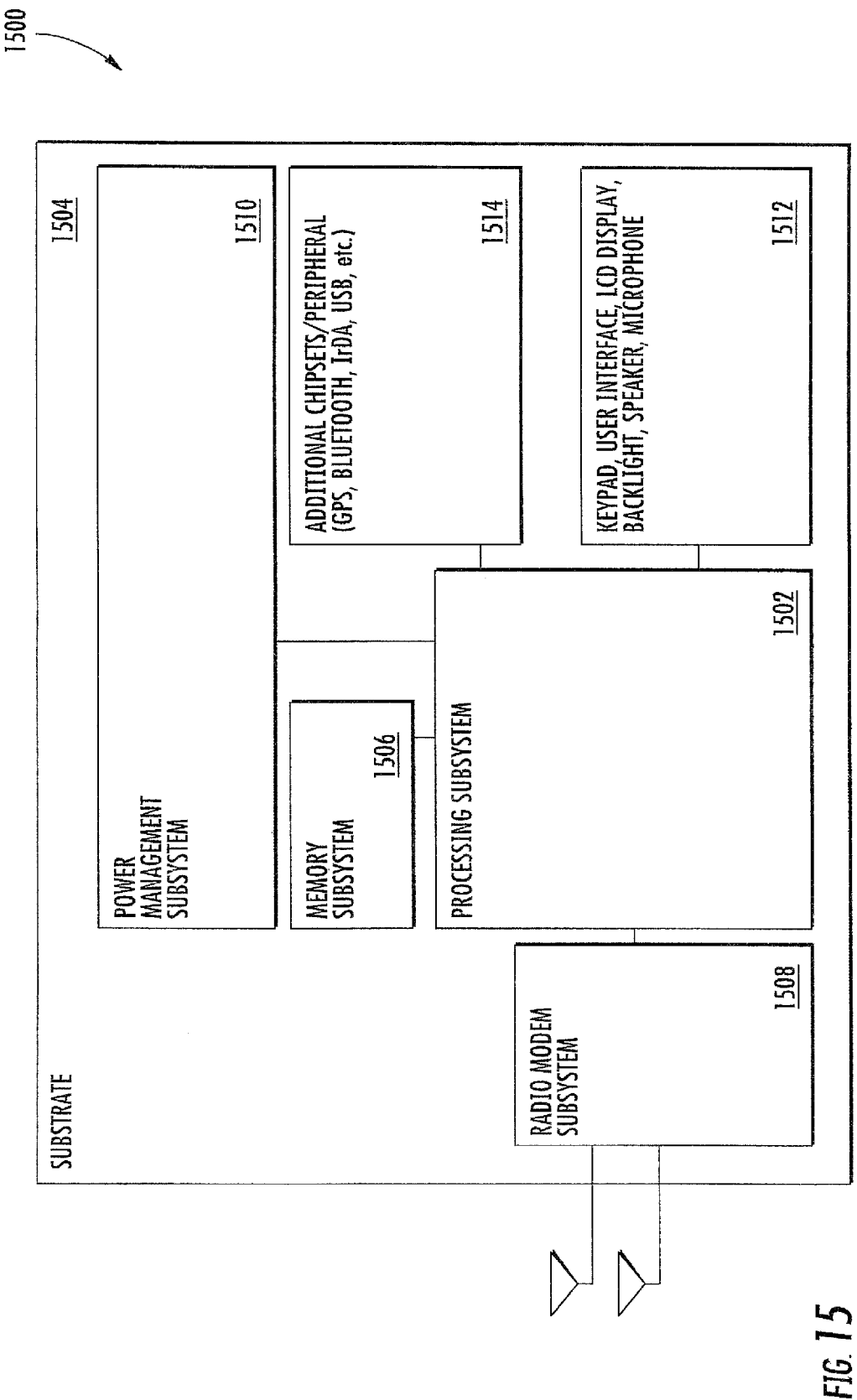
FIG. 15 is a functional block diagram illustrating one embodiment of a client device (e.g., UE) adapted to implement the methods of the present invention.

Referring now to FIG. 15, exemplary client or UE apparatus 1500 implementing the methods of the present invention is illustrated. As used herein, the terms "client" and "UE" include, but are not limited to cellular telephones, smartphones (such as for example the iPhone™ device manufactured by the Assignee hereof), personal computers (PCs), such as for example an iMac™, Mac Pro™, Mac Mini™ or MacBook™, and minicomputers, whether desktop, laptop, or otherwise, as well as mobile devices such as handheld computers, PDAs, personal media devices (PMDs), such as for example an iPod™, or any combinations of the foregoing. The configuration of paging channel reception is preferably performed in software, although firmware and/or hardware embodiments are also envisioned.

The UE apparatus 1500 includes a processor subsystem 1502 such as a digital signal processor, microprocessor, field-programmable gate array, or plurality of processing components mounted on one or more substrates 1504. The processing subsystem may also comprise an internal cache memory. The processing subsystem 1502 is connected to a memory subsystem 1506 comprising memory which may for example, comprise SRAM, flash and SDRAM components. The memory subsystem may implement one or a more of DMA type hardware, so as to facilitate data accesses as is well known in the art.

The radio/modem subsystem 1508 comprises a digital baseband, analog baseband, TX frontend and RX frontend. The apparatus 1500 further includes an antenna assembly; the selection component may comprise a plurality of switches for enabling various antenna operational modes, such as for specific frequency ranges, or specified time slots. While specific architecture is discussed, in some embodiments, some components may be obviated or may otherwise be merged with one another (such as RF RX, RF TX and ABB combined, as of the type used for 3G digital RFs) as would be appreciated by one of ordinary skill in the art given the present disclosure.

The analog baseband typically controls operation of the radio frontends therefore; the digital baseband modem loads the analog baseband with parameters for the reception of paging channel messages. The selection component may be controlled by the analog baseband to receive paging channel messages to offload such controlling functions from the digital baseband modem.

The illustrated power management subsystem (PMS) 1510 provides power to the UE, and may comprise an integrated circuit and or a plurality of discrete electrical components. In one exemplary portable UE apparatus, the power management subsystem 1006 advantageously interfaces with a battery.

The user interface system 1512 includes any number of well-known I/O including, without limitation: a keypad, touch screen, LCD display, backlight, speaker, and microphone. However, it is recognized that in certain applications, one or more of these components may be obviated. For example, PCMCIA card type UE embodiments may lack a user interface (as they could piggyback onto the user interface of the device to which they are physically and/or electrically coupled).

The apparatus 1500 further includes optional additional peripherals 1514 including, without limitation, one or more GPS transceivers, or network interfaces such as IrDA ports, Bluetooth transceivers, USB, Firewire, etc. It is however recognized that these components are not required for operation of the UE in accordance with the principles of the present invention.

In the illustrated embodiment, the modem subsystem 1508 additionally includes subsystems or modules for: requesting paging agreements, refreshing paging agreements, and selectively receiving paging messages in accordance with the paging agreement. These subsystems may be implemented in software or hardware, which is coupled to the radio modem subsystem. Alternatively, in another variant, the subsystems may be directly coupled to the processing subsystem 1502.

An exemplary UE is configured to transmit an update messages that includes current context information; the update message facilitates generation of a paging agreement. Subsequently thereafter, the UE receives a paging agreement, based on the transmitted context information. The accepted paging agreement is used for further operation (see previously referenced FIGS. 13 and 14).

In one exemplary embodiment, the UE apparatus configures its paging channel reception in accordance with the paging agreement and related context information. Once the UE apparatus has received the paging agreement, a "heartbeat" timer is set to periodically transmit refresh messages, to extend the current paging agreement. If the UE should desire termination of the paging agreement, the UE simply refuses to transmit the heartbeat. In yet other embodiments, the heartbeat message may include other context information, or supplemental updates, for the base station's internal database.

During operation, the UE apparatus can optimize paging channel reception to the resources and scheduling of the paging agreement. In one exemplary implementation, the UE may only check a subset of all possible Component Carriers. Other variants of the timer implementations, context information, and conditional paging channel reception are readily implemented by an artisan of ordinary skill, given the present disclosure.

Business Methods and Rules—

It will be recognized that the foregoing network apparatus and methodologies may be readily adapted to various business models.

In one business paradigm, appropriately configured user equipment (e.g., UE 1500) may receive enhanced paging messages, and may efficiently monitor existing paging channels, thus increasing the overall perceived quality of experience. In one such embodiment, a dedicated subset of paging channels are allocated to enabled UEs. Thus while, legacy devices continue to broadly monitor all paging channels (in a comparatively inefficient manner), UE devices 1500 according to the invention only monitor the designated subset of paging channels. This approach is markedly more efficient, and significantly improves power consumption, thereby leading to enhanced user experience and differentiation over competing products.

The aforementioned network apparatus and methodologies may also be readily adapted for operation in accordance with an underlying business rules algorithm or "engine". This business rules engine may comprise for example a software application (and/or firmware or even hardware aspects), and is implemented in one embodiment as a separate entity at the base station. A business rules engine may find particular benefit in femtocell deployments (e.g., as part of an enhanced offering by a small business concern, or residential equipment). The rules engine is in effect a high-layer supervisory process which aids the base station operator (or other interested party) in making operational decisions or resource allocations based on important criteria such as financial aspects, user experience enhancement, etc.

In one embodiment, the business rules engine is configured to take into account the revenue and/or profit implications associated with providing resources to one or more users. Accordingly, the exemplary business rules engine can modify the paging channel behaviors of the system to support a wider base of users (e.g. using fewer CC slices per user) or alternatively, legacy support or robust operation (e.g. allocating more CC slices per user).

For instance, in one example, evaluation of the requests from a population of users for resources (e.g., frequency spectrum) may include an analysis of the incremental cost, revenue, and/or profit associated with the various allocation options. In some cases, the network provider may determine that new service requests are uncommon, and thus paging is loss important. In other cases, the network provider may determine that new users and services are frequently entering and exiting a cell, thus requiring an allocation of more paging resources. These "business rules" may be imposed e.g., at time of resource request, and then maintained for a period of time (or until an event triggering a re-evaluation occurs), or alternatively according to a periodic model.

Myriad other schemes for implementing dynamic allocation of resources will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of paging a mobile device from a base station in a wireless network based on a selected resource used by the mobile device to receive a paging channel, the method comprising:
   selecting, by the base station, a resource to be used by the mobile device to receive paging information,
   sending the paging information to the mobile device from the base station using only a paging channel of the selected resource;
   generating a paging agreement between the mobile device and the base station; and
   refreshing the paging agreement using a periodic refresh message.

2. The method of claim 1, wherein the selected resource comprises at least one component carrier (CC).

3. The method of claim 1, wherein the selected resource used by the mobile device to receive the paging channel is used in an idle mode.

4. The method of claim 1, wherein the information transmitted by the mobile device comprises context information for the mobile device, said context description comprises a description of at least one paging resource available to the mobile device.

5. The method of claim 1, wherein the paging information comprises an acknowledgement message from the base station.

6. A base station apparatus, comprising:
a digital processor;
a radio interface in data communication with the processor; and
a storage device in data communication with the processor, the storage device comprising computer-executable instructions that, when executed by the digital processor cause the base station to:
   select a resource to be used by the mobile device to receive paging information,
   send the paging information to the mobile device from the base station using only a paging channel of the selected resource;
   generate a paging agreement between the mobile device and the base station; and
   refresh the paging agreement using a periodic refresh message.

7. The apparatus of claim 6, wherein the base station comprises an LTE-compliant eNodeB, and the mobile device comprises an LTE-compliant UE.

8. The apparatus of claim 7, wherein the selected resource comprises at least one component carrier (CC).

9. The apparatus of claim 8, wherein the base station comprises an LTE-A (Long Term Evolution-Advanced)-compliant eNodeB which is configured to support a 20-MHz maximum bandwidth for the at least one component carrier.

10. The apparatus of claim 6, wherein the base station comprises an LTE-A (Long Term Evolution-Advanced)-compliant eNodeB which is backward-compatible with at least one legacy LTE (Long Term Evolution) paging resource.

11. The apparatus of claim 6, wherein the selected resource used by the mobile device to receive the paging channel is used in an idle mode.

12. The apparatus of claim 6, wherein the information transmitted by the mobile device comprises context information for the mobile device, said context description comprises a description of at least one paging resource available to the mobile device.

13. The apparatus of claim 6, wherein the paging information comprises an acknowledgement message from the base station.

14. An LTE-compliant eNodeB base station that performs the method of claim 1.

15. The base station of claim 14, wherein the base station comprises an LTE-A (Long Term Evolution-Advanced) compliant eNodeB which is configured to support a 20-MHz maximum bandwidth for the at least one component carrier.

16. The base station of claim 14, wherein the base station comprises an LTE-A (Long Term Evolution-Advanced) compliant eNodeB which is backwards-compatible with at least one legacy LTE (Long Term Evolution) paging resource.

17. The method of claim 1, wherein if no selected resource information exists, no paging information is sent to the mobile device.

18. A base station apparatus of claim 6, wherein if no selected resource information exists, no paging information is sent to the mobile device.

* * * * *